UNITED STATES PATENT OFFICE.

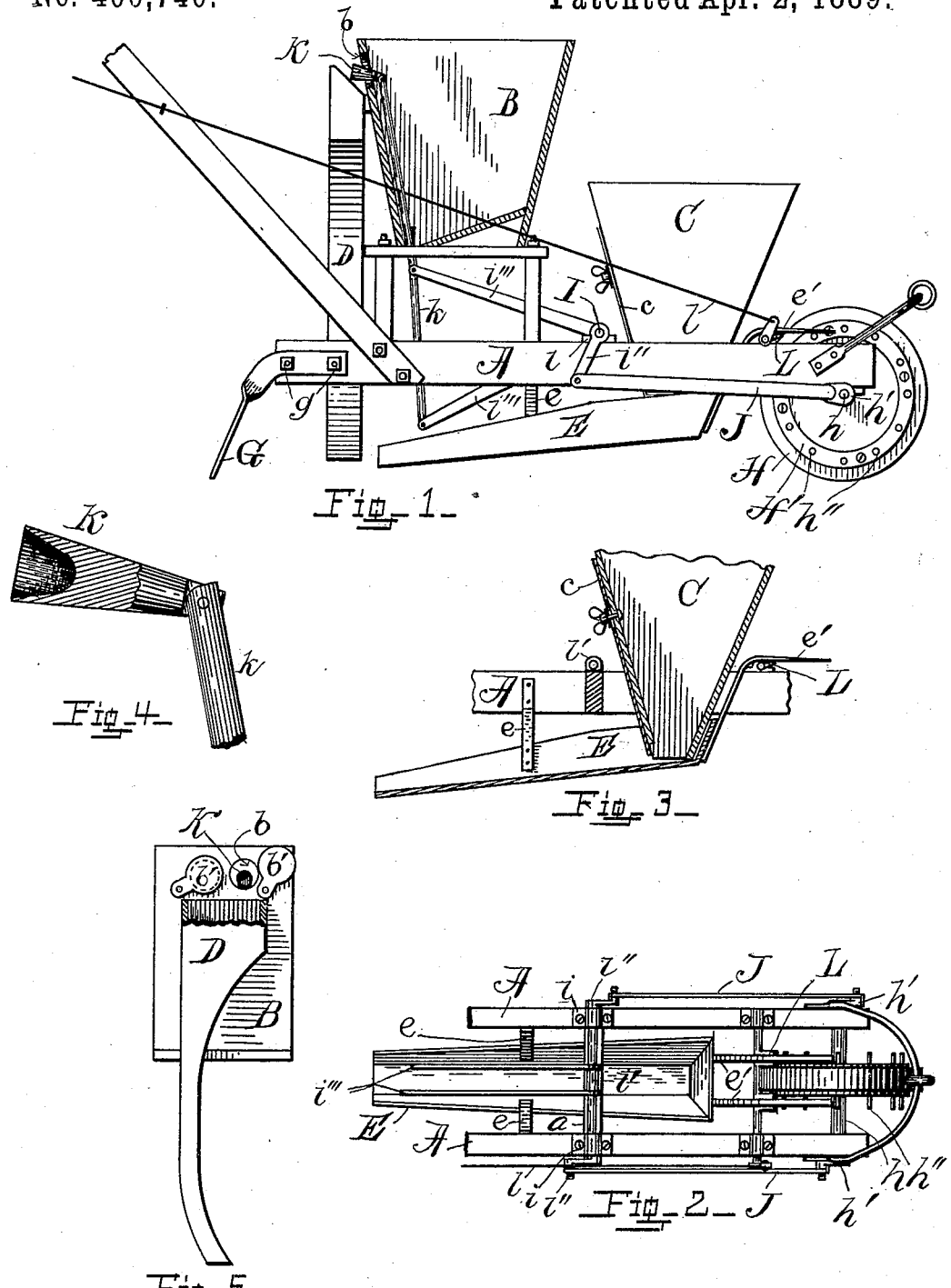

JOHN B. BROADWELL, OF ALPHARETTA, GEORGIA.

CORN-PLANTER AND FERTILIZER-DISTRIBUTER.

SPECIFICATION forming part of Letters Patent No. 400,740, dated April 2, 1889.

Application filed May 16, 1888. Serial No. 274,075. (No model.)

*To all whom it may concern:*

Be it known that I, JOHN B. BROADWELL, a citizen of the United States, residing at Alpharetta, in the county of Milton and State of Georgia, have invented a new and useful Corn-Planter and Fertilizer-Distributer; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has reference to that class of agricultural implements used for planting seed.

The object attained is the furnishing of a machine that will plant the seeds in hills with regularity and distribute any desired quantity of fertilizer.

The invention consists of a new and useful combination of devices to accomplish this end, all of which is hereinafter fully set forth, and the parts thought to be new pointed out in the claim.

In the accompanying drawings, Figure 1 is a side elevation of the machine with the seed-hopper in section. Fig. 2 is a plan of the fertilizer-distributing shoe and contiguous parts. Fig. 3 is a side elevation in central longitudinal section of the fertilizer-distributing shoe and its hopper. Fig. 4 is a view, approximating full size, of the seed-caps and the rod carrying the same. Fig. 5 is a view of the seed-hopper from the direction of the handles, showing the chute for conveying the seed to the furrow and the hopper-outlets and their covers, one outlet being opened and a seed-cup shown entering from the inside to discharge its seeds.

In the figures, like reference-marks indicating corresponding parts in the several views, A is the frame, B the seed-hopper, and C the fertilizer-hopper.

D is the chute for conveying the seed to the ground, and E is the shoe that conveys the fertilizer to the furrow. It will be observed that this shoe extends nearly to the chute D.

When it is found desirable to cover the fertilizer before depositing the seed, as is frequently the case, a set of coverers of any approved form may be attached in the rear of the shoe E, but ahead of the chute D, being secured by the bolts holding the handles F in place, or otherwise, by means of which a little soil may be thrown in the furrow on top of the fertilizer. The seed then falling on top of this soil will be covered in the usual way.

G are coverers, which may be of any approved form, and are attached to the frame A by bolts $g$. The wheel H is carried on the shaft $h$, which shaft has on each end a crank, $h'$. At about the center of the frame are journaled the shafts I, each reaching to the center and journaled in the boxes $i$ on the frame and the box $i'$ on the bar $a$. On the outer end of each of these shafts are the cranks $i''$, which cranks are connected to the cranks $h'$ by the connecting-rods J. Near the inner end of each of the shafts I are the arms $i'''$, securely fastened thereto in any desired manner. Fastened to the ends of these arms $i'''$ and extending up through the bottom of the hopper B are the rods $k$, carrying the seed-cups K, which are pivoted thereto in such a manner that they will swing over and drop through the openings $b$ in the hopper unless the covers $b'$ are closed.

It is obvious that the cups K will spill out their contents into chute D when they drop through said holes, and chute D will convey the said seeds to the furrow. The cranks $h'$ being set oppositely on the shaft $h$, the arms $i'''$, and consequently the seed-cups K, will be raised alternately, and, the holes $b$ being open, said cups will deliver their load to the chute D.

It will be readily seen that by partitioning off the hopper B into two compartments and placing seed of a different kind in each compartment two kinds of seed may be alternately planted, and that by setting the cranks $h'$ in the same direction a double quantity of seed may be placed in the same hill. The hopper B has a sloping bottom, so as to insure all the seed being removed.

The hopper C is open at its bottom, as shown in Fig. 3, to allow the fertilizer to rest on the bottom of the chute D, and the discharge-opening in the side is provided with the slide $c$ to adjust it. The shoe E is pivoted at about its center by means of the straps $e$, of leather or other sufficiently flexible material. (Best shown in Fig. 3.) On the front end of said shoe are attached the arms $e'$, which, by contact with the pins $h''$ on the wheel, agitate the shoe, each agitation allowing the fertilizer (the quantity being governed by the slide $c$) to make its exit and be gradually carried down the sloping shoe to the furrow, assisted by gravity and the agitation. To stop the agitation of this shoe E, the cams L, which impinge against the arms $e'$, lift them from contact with the pins $h''$, said cams being operated by the rod $l$, extending back to the handles. The pins $h''$ are attached to the wheel H by means of the flat rings H', with which they are preferably made integral, the rings being screwed or bolted to the wheel. These rings strengthen the wheel and make it possible to make a substantial wheel of a single piece of wood instead of several thicknesses, as has heretofore been usual. The chute D is attached to one side and curved, as shown in Fig. 5, to allow the operator when standing at the handles to see the fertilizer that is being discharged from the shoe E.

I am aware that it is not new to use pivoted seed-cups having a vertical movement to take seed from a hopper and deposit it in a seed-spout. I do not, therefore, broadly claim such devices, but limit my claim to the special construction and arrangement of the several parts of the machine by which these results are accomplished.

Having thus described my invention, what I claim as new, and desire to secure by Letters Patent of the United States, is—

In a planter, the seed-distributing mechanism, consisting of the wheel H, its shaft $h$, provided with cranks $h'$ at each end, the connecting-rods J, rock-shafts I, having cranks $i''$ and arms $i'''$, rods $k$, and the pivoted seed-cups K, the hopper B, provided with the holes $b$, having adjustable covers $b'$, and the curved chutes D, for depositing the seed in the furrow, all arranged and operating substantially as shown and described.

In testimony whereof I hereunto affix my signature in presence of two witnesses.

JOHN B. BROADWELL.

Witnesses:
S. L. RUCKER,
I. T. CRISLER.